United States Patent
Drews et al.

(10) Patent No.: US 9,182,774 B2
(45) Date of Patent: Nov. 10, 2015

(54) METHOD FOR OPERATING AN ACCELERATOR PEDAL UNIT FOR MOTOR VEHICLES

(75) Inventors: Frank Drews, Röthenbach (DE); Peter Habel, Nürnberg (DE); Carmelo Leone, Freising (DE)

(73) Assignee: Conti Temic microelectronic GmbH (DE)

( * ) Notice: Subject to any disclaimer, the term of this patent is extended or adjusted under 35 U.S.C. 154(b) by 420 days.

(21) Appl. No.: 13/877,353

(22) PCT Filed: Sep. 28, 2011

(86) PCT No.: PCT/EP2011/066847
§ 371 (c)(1),
(2), (4) Date: Apr. 2, 2013

(87) PCT Pub. No.: WO2012/045625
PCT Pub. Date: Apr. 12, 2012

(65) Prior Publication Data
US 2013/0186229 A1    Jul. 25, 2013

(30) Foreign Application Priority Data

Oct. 6, 2010   (DE) .......................... 10 2010 042 036
Jul. 19, 2011   (DE) .......................... 10 2011 079 375

(51) Int. Cl.
| | | |
|---|---|---|
| *G01D 18/00* | (2006.01) | |
| *G05G 1/44* | (2008.04) | |
| *B60K 26/02* | (2006.01) | |
| *G05G 1/38* | (2008.04) | |
| *G05G 5/03* | (2008.04) | |

(52) U.S. Cl.
CPC ................ *G05G 1/44* (2013.01); *B60K 26/021* (2013.01); *G05G 1/38* (2013.01); *G05G 5/03* (2013.01); *Y02T 10/84* (2013.01); *Y10T 74/20534* (2015.01)

(58) Field of Classification Search
None
See application file for complete search history.

(56) References Cited

U.S. PATENT DOCUMENTS 5,825,901 A    10/1998  Hisey
7,022,045 B2 *  4/2006  Yone .......................... 477/120

FOREIGN PATENT DOCUMENTS

| DE | 102 12 674 A1 | 10/2003 |
| DE | 10 2004 025 829 A1 | 12/2005 |
| EP | 1 602 520 A2 | 12/2005 |

OTHER PUBLICATIONS

International Search Report for PCT/EP2011/066847 mailed Mar. 28, 2012.

* cited by examiner

*Primary Examiner* — Robet R Raevis
(74) *Attorney, Agent, or Firm* — RatnerPrestia

(57) ABSTRACT

A method for operating an accelerator pedal unit for motor vehicles, wherein a change in position of the pedal plate, which is brought about by a corresponding activation force, with respect to the starting position of said pedal plate counter to a restoring force of a pedal restoring spring brings about an increase in the driving force of the drive motor of the motor vehicle, and when the activation force diminishes the restoring force of the pedal restoring spring moves the pedal plate back in the direction of its starting position, wherein an electromechanical actuator which can be actuated externally is arranged in such a way that an additional restoring force acting on the pedal plate can be set.

10 Claims, 4 Drawing Sheets

METHOD FOR OPERATING AN ACCELERATOR PEDAL UNIT FOR MOTOR VEHICLES

CROSS REFERENCE TO RELATED APPLICATIONS

This application is the U.S. National Phase Application of PCT/EP2011/066847, filed Sep. 28, 2011, which claims priority to German Patent Application Nos. 10 2010 042 036.0, filed Oct. 6, 2010 and 10 2011 079 375.5, filed Jul. 19, 2011, the contents of such applications being incorporated by reference herein.

FIELD OF THE INVENTION

The present invention relates to a method for operating an accelerator pedal unit for motor vehicles, wherein a change in position of the pedal plate, which is brought about by a corresponding activation force, with respect to the starting position of said pedal plate counter to a restoring force of a pedal restoring spring brings about an increase in the driving force of the drive motor of the motor vehicle, and when the activation force diminishes the restoring force of the pedal restoring spring moves the pedal plate back in the direction of its starting position, wherein an electromechanical actuator which can be actuated externally is arranged in such a way that an additional restoring force acting on the pedal plate can be set.

BACKGROUND OF THE INVENTION

In modern motor vehicles there is generally the problem that the vehicle driver is supplied with a large amount of information relating to his motor vehicle. This overstimulation of the vehicle driver by acoustic and optical signals causes the driver to be distracted from the traffic.

As a result, the vehicle driver has a tendency to fail to hear or to ignore the signals, or he can no longer assign the signals to their cause. An accelerator pedal unit of the generic type mentioned at the beginning avoids all the disadvantages of optical and acoustic systems: it is a suitable man/machine interface for longitudinal dynamics functions (inter-vehicle distance information, speed limitation and cruise control) as well as for displaying warnings of hazards or for displaying gearshift displays for a manual shift transmission.

DE 10 2004 025 829 B4, which is incorporated by reference, discloses a device in which the opposing force element is formed by a torque motor with fixed field coils on the stator and with a magnetic disk, with opposing magnetization at various locations, on the rotor. Such torque motors are distinguished by the fact that they make available very high torques. Electrodynamic and geometric nonlinearities are disadvantageous and lead to a situation in which, when identical electrical actuation occurs an identical force sensation is not generated at the driver's foot.

SUMMARY OF THE INVENTION

An aspect of the present invention is therefore to improve a method of the generic type specified at the beginning to the effect that a predictable force sensation for the vehicle driver is generated at his foot.

This is achieved by a method wherein a calibration process is carried out, with the result that a linear relationship is implemented between the setpoint current request ($I_{setp}$) to the electromechanical actuator and the additional restoring force ($F_{add}$) over the entire pedal stroke (S). In this context, there is provision that a calibration process is carried out, with the result that a linear relationship is implemented between the setpoint current request to the electromechanical actuator and the additional restoring force over the entire pedal stroke. When identical actuation occurs, this measure has the effect that the identical force sensation is always generated at the vehicle driver's foot. As a result, a good sensation is imparted to the vehicle driver because he experiences a recurring, and therefore after a certain time familiar, force sensation. This is implemented by the fact that the calibration process is carried out in such a way that constant force value of the additional restoring force is generated for a predetermined setpoint current request at each angular position of the electromechanical actuator.

One advantageous development of the method according to an aspect of the invention provides that the calibration process is carried out using a characteristic diagram. The characteristic diagram is preferably embodied as a matrix which is determined on the basis of empirically acquired data or on the basis of a model calculation of the accelerator pedal unit. A model calculation is understood here to be the programming of a model on a computer which takes into account the geometric and electrodynamic nonlinearities of the accelerator pedal unit and calculates a virtual model of the accelerator pedal unit.

In order to carry out the calibration process there is provision that the angular position of the electromechanical actuator and a setpoint current request are fed to the characteristic diagram from a control unit. In this context, the angular position of the electromechanical actuator is filtered before the value of the angular position is fed to the characteristic diagram. The output value from the characteristic diagram, which arises from the fed-in values of the angular position and the setpoint current request, is subsequently multiplied by the setpoint current request in order to obtain a corrected setpoint current request.

In one preferred embodiment, the corrected setpoint current request is fed to a further characteristic curve for correction once more. Furthermore, the setpoint current request which is corrected in this way can be adapted a final time by weighting with a correction factor.

In order to record the empirically acquired data or for the purpose of success control of the calibration process, a force measuring pickup is arranged on the tread area of the pedal plate in order to measure the additional restoring force generated by the electromechanical actuator.

BRIEF DESCRIPTION OF THE DRAWINGS

The invention will be explained in more detail below on the basis of an exemplary embodiment and with reference to the appended drawing, in which.

DETAILED DESCRIPTION OF THE INVENTION

Figure 1:
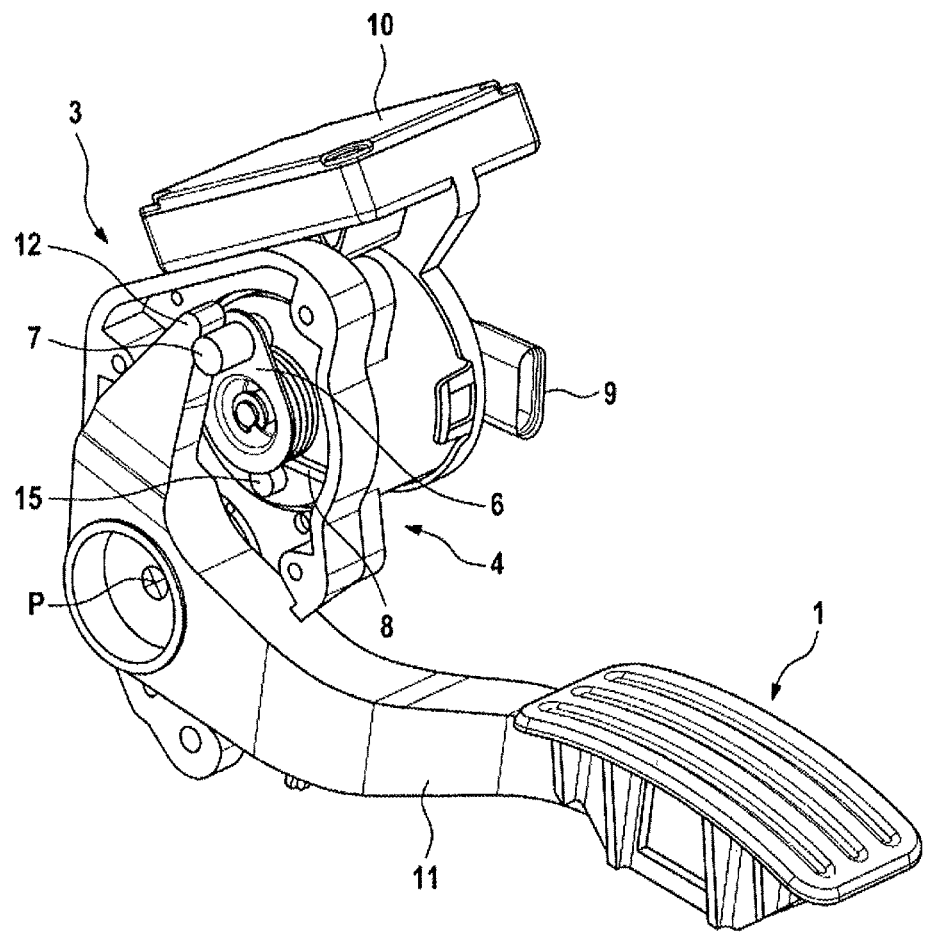
FIG. 1 shows a schematic illustration of an accelerator pedal unit on which the method according to the invention can be carried out.

FIG. 1 illustrates an accelerator pedal unit for motor vehicles. If the vehicle driver steps on a pedal plate 1 of the accelerator pedal unit and a change in position of the pedal plate, brought about by the corresponding foot actuation force of said vehicle driver, of the pedal plate with respect to the starting position counter to a restoring force $F_{res}$ occurs, this brings about an increase in the driving force of the drive motor of the motor vehicle. In this context, it is irrelevant whether the drive motor of the motor vehicle is implemented by an internal combustion engine or one or more electromotors or by a combination of the specified motors. If the vehicle driver releases his foot from the pedal plate 1, a restoring force $F_{res}$ moves the pedal plate 1 back in the direction of its starting position. This restoring force is generated by a pedal restoring spring 2 (not illustrated in FIG. 1). The embodiment illustrated in FIG. 1 is also referred to as a hanging accelerator pedal unit: the pedal plate 1 is connected to a pedal lever which is mounted so as to rotate about an axis P. The method described here can also be applied to stationary accelerator pedal units.

In modern motor vehicles, numerous optical and/or acoustic items of information are conveyed to the vehicle driver by display systems. When there is a multiplicity of such optical and/or acoustic items of information, the vehicle driver can easily overlook important information or not perceive it. Haptic information is therefore conveyed to the vehicle driver in a particularly simple way via the accelerator pedal unit. The accelerator pedal unit illustrated in FIG. 1 is capable of using an electromechanical actuator 4 to generate an additional restoring force $F_{add}$ which acts counter to the actuation force of the vehicle driver when the pedal plate 1 is depressed. Furthermore, vibrations or chronologically short force impulses can also be generated at the pedal plate 1 using the electromechanical actuator 4, said pedal plate 1 being perceived by the driver by means of his foot which is resting on the pedal plate 1. It is therefore possible, for example, to ensure operation of the motor vehicle in an economic, consumption-reducing fashion by virtue of the fact that the vibration of the pedal plate 1 or the force impulse on the pedal plate 1 warns of an inefficient motor rotational speed of the drive motor. Other haptic information which can be conveyed to the vehicle driver is also the conveying of safety-critical information such as an inadequate distance from the vehicle traveling in front.

The additional restoring force $F_{add}$ is transmitted to the pedal lever 11 and therefore to the pedal plate 1 via an arm 12. The electromechanical actuator 4 is embodied as a torque motor in the present exemplary embodiment. Torque motors are defined by the fact that they make available very high torques. The electromechanical actuator 4 acts as a force restoring device whose additional restoring force $F_{add}$ acts on the pedal lever 11 and/or the pedal plate 1 in the direction of reducing the speed of the motor vehicle. A drive disk 6 is arranged so as to be rotatable with the electromechanical actuator 4 and said drive disk 6 can apply the additional restoring force $F_{add}$ to the pedal lever 11 by means of a drive roller 7 or other suitable devices such as, for example, sliding free-form faces. A control unit 10 for controlling the electromechanical actuator 4 is also integrated in a common housing 3. An interface 9 comprises the power supply of the power electronics and therefore that of the electromechanical actuator 4 in order to permit signals to be exchanged between the control unit 10 and further control devices outside the accelerator pedal unit via a communication bus in the motor vehicle, for example a CAN bus.

Figure 2:
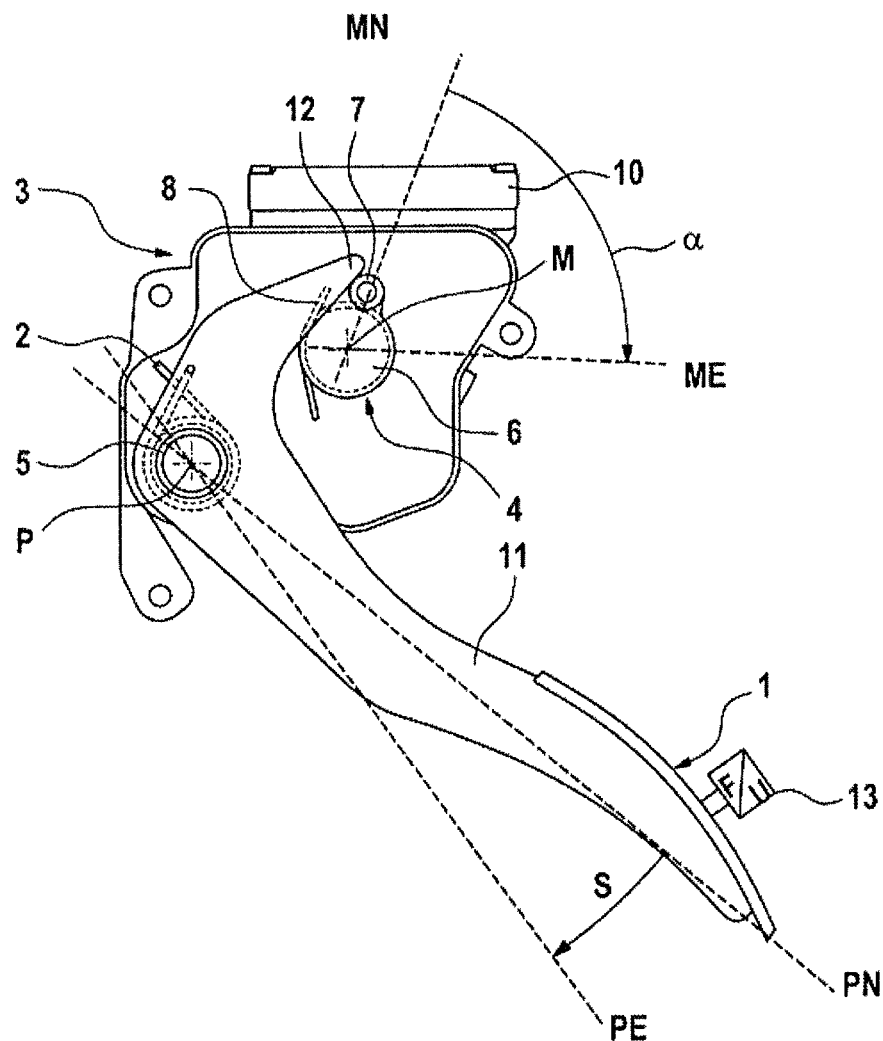
FIG. 2 shows a sectional illustration of the accelerator pedal unit in its unactivated zero position.

FIG. 2 shows an accelerator pedal unit having an accelerator pedal 11 in its unactivated zero position PN. That is to say the vehicle driver's foot does not apply any force on the pedal plate 1 in the direction of increasing the speed of the motor vehicle. As already mentioned, the pedal plate 11 is arranged such that it can pivot about the pivot point P, specifically from a zero position PN to the end position PE. In this end position P, the accelerator pedal unit is fully activated and the vehicle driver wishes to move his vehicle forward at full force. The range from the zero position PN to the end position PE is also described by the term pedal stroke S. In the zero position PN, the pedal stroke S=0%, and in the end position PE the pedal stroke S correspondingly=100%. At the pivot point P of the pedal lever 11, a leg spring is arranged as a pedal restoring spring 2 in such a way that it presses the pedal lever 11 into its zero position PN with the restoring force $F_{res}$. The rotational axis of the electromechanical actuator 4 rotates from an end position ME to its zero position MN. The position of the rotational axis of the electromechanical actuator 4 is characterized here by the angle α. In the described exemplary embodiment, the pivot points P and M of the pedal lever 11 and of the electric motor 4 are separated in terms of location. However, an accelerator pedal unit in which the two pivot points P and M coincide would also be completely conceivable.

An actuator restoring spring 8 is arranged on the electromechanical actuator 4 in such a way that the drive disk 6 of the electromechanical actuator 4 also presses the pedal lever 11 in the direction of its zero position PN by means of the driver roller 7, in particular if the electromechanical actuator 4 is not energized. In this context, in each case one end of the pedal restoring spring 2 or actuator restoring spring 8 is respectively permanently connected to the housing 3 in the pressing direction of the spring here. Here, one end of the actuator restoring spring 8 is attached to the journal of the housing 3. The other end of the pedal restoring spring 2 acts on the pedal lever 11 and/or that of the motor restoring spring 8 acts on the drive disk 6. The angular range which is determined by the respective zero position MN, PN and end position ME, PE of the springs 2, 8 is larger with respect to the zero position MN and also with respect to the end position ME than in the case of the pedal restoring spring 2. This ensures that the drive disk 6 bears on the arm 12 of the pedal lever 11 via the drive roller 7 at any time. That is to say the motor restoring spring 8 is always prestressed, at least in the unenergized state of the electromechanical actuator 4.

Figure 3:
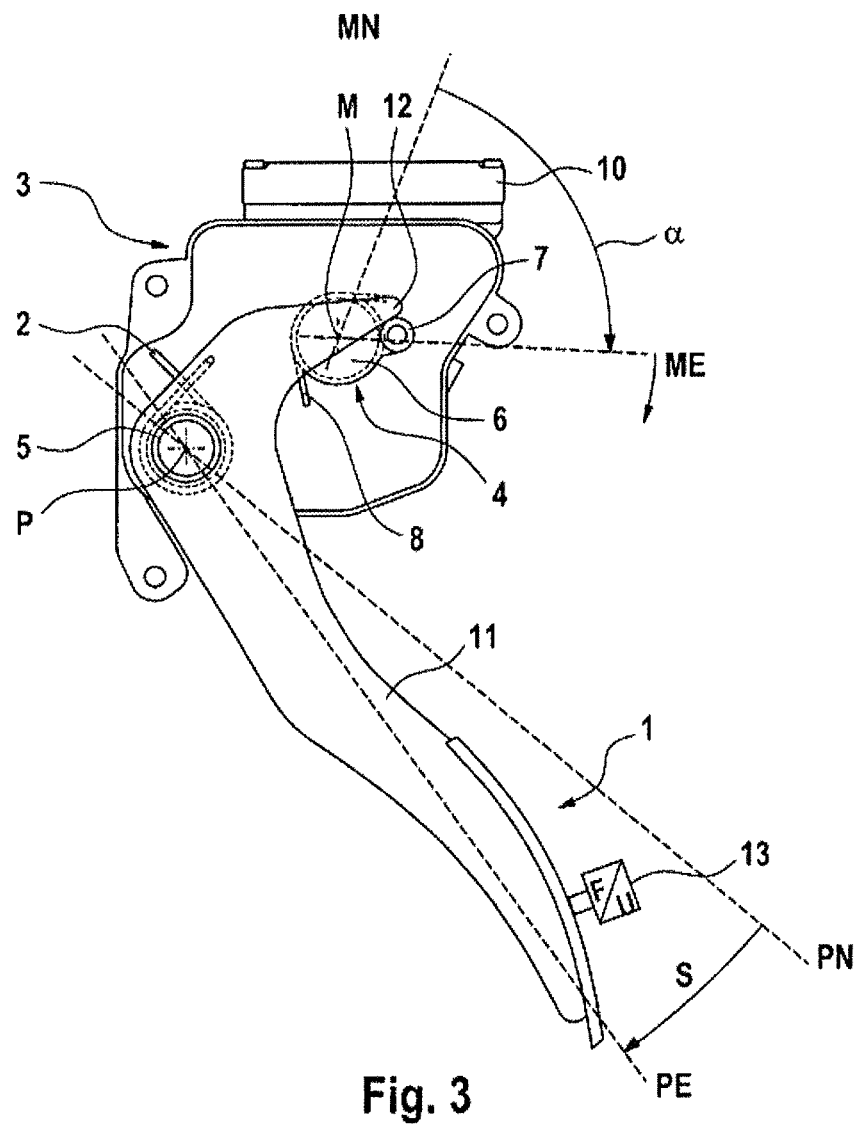
FIG. 3 shows a sectional illustration of the accelerator pedal unit in its activated end position.

FIG. 3 corresponds to the illustration in FIG. 2 with the one difference that the pedal lever 11 is in its end position PE. The end position ME of the electric motor 4 is, however, not yet reached, which is in turn indicated by the arrow in the direction ME.

In order to actuate the electric motor 4, in particular by means of a control unit 11 which is integrated in the pedal system, it is advantageous to sense the angular position α of the electromechanical actuator 4 by means of a corresponding sensor, for example a Hall sensor. Corresponding sensors are, however, not shown in the figures. Alternatively, the position of the electromechanical actuator 4 can be inferred from the position of the pedal lever 11 by means of software while doing without the sensor just mentioned, wherein the position of the pedal lever 11 of the control unit 10 is preferably signaled via the communication bus. As a result of this procedure, the safety-related aspects which result from electrical coupling of the sensor for the position of the pedal lever 11 and of the control unit 10 are avoided.

The problem that the method described here solves is that electrodynamic and geometric nonlinearities lead to a situation in which when identical electrical actuation occurs an identical force sensation is not generated at the driver's foot over various angular positions α of the electromechanical actuator 4. If the control algorithms in the control unit of the electromechanical actuator 4 are actuated in a specific angular position α with a fixed setpoint current request $I_{setp}$, the electromechanical actuator generates a specific additional restoring force $F_{add}$. If the same setpoint current request $I_{setp}$ is then effective at another angular position α of the electromechanical actuator 4, the electromechanical actuator 4 generates a different additional restoring force $F_{add}$ without the method for calibrating force. The additional restoring force $F_{add}$ which results at the pedal plate 1 is sensed here by a force measuring pickup 13.

Figure 4:
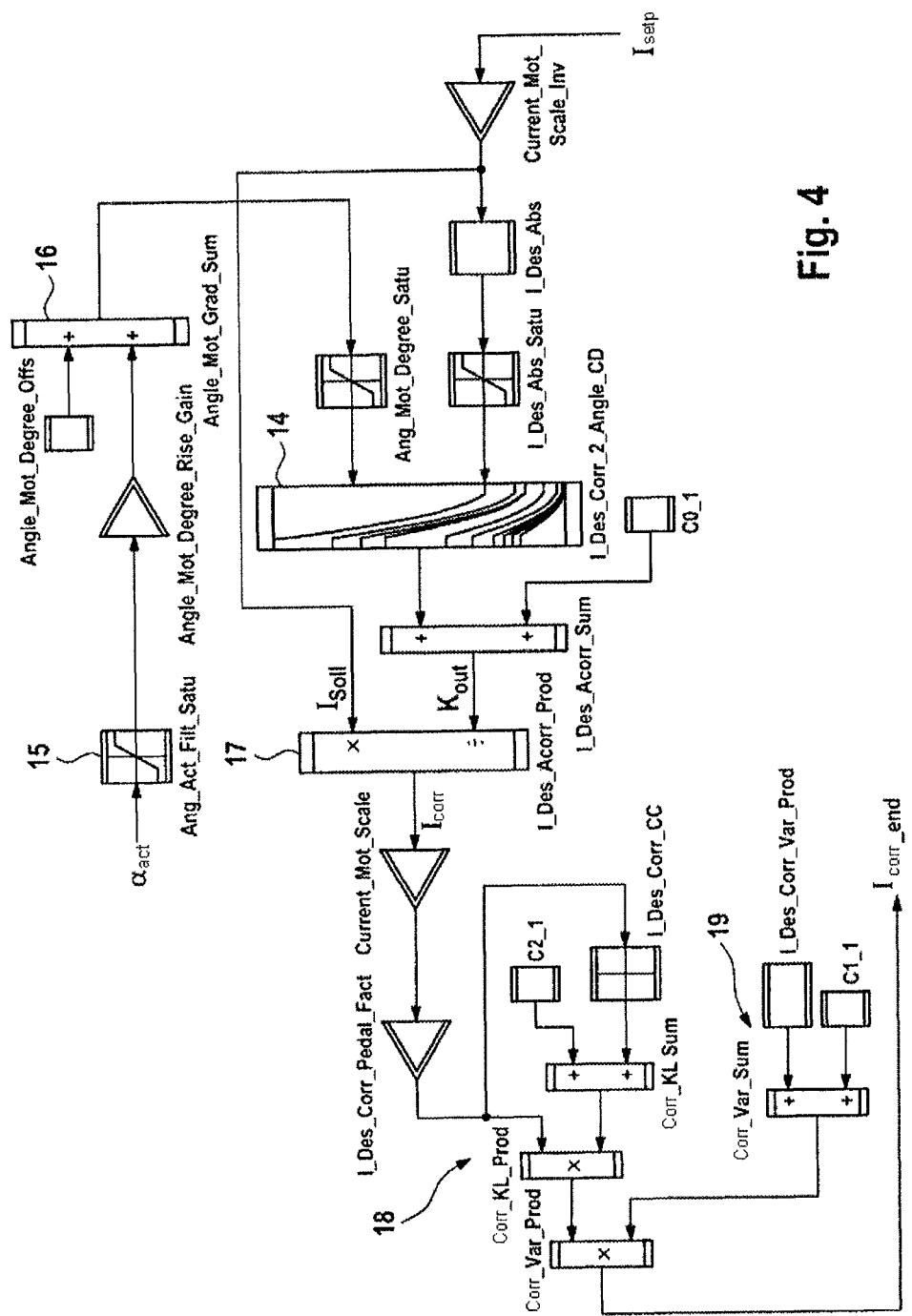
FIG. 4 shows a flowchart of the method according to the invention.

The present method then proposes that a calibration process is carried out with the result that a linear relationship is implemented between the above setpoint current request $I_{setp}$ and the additional restoring force $F_{add}$ over the entire pedal stroke S. The actual current $I_{act\_motor}$ which ultimately actually flows in the electromechanical actuator 4 is generally unequal in absolute value to the setpoint current request. The method has three stages and is explained in more detail with reference to FIG. 4: firstly, in step 15, in the first stage of the method, the measured angular position α of the electromechanical actuator 4 is limited, and in the method step 16 it is output as a re-standardized angular position α and fed to a two-dimensional characteristic diagram 14. The second input variable for the characteristic diagram 14 is a setpoint current request $I_{setp}$ of the control unit 10, which is changed by the calibration process in such a way that the desired linear relationship between the setpoint current request $I_{setp}$ and the additional restoring force $F_{add}$ is produced. In this first stage of the force calibration the characteristic diagram 14 then outputs an output value $K_{out}$ which is multiplied in step 17 by the setpoint current request $I_{setp}$ in order to obtain the corrected setpoint current $I_{corr}$.

In a second stage of the force calibration, the corrected setpoint current request $I_{corr}$ is fed in step 18 to a further suitable characteristic curve. This second stage is in principle redundant with respect to the just described first stage of the calibration process including the characteristic diagram 14. In the second stage of the force calibration, a correction factor $I_{variant}$, which depends on this setpoint current request $I_{corr}$ corrected in the first stage, is added to the corrected setpoint current request $I_{corr}$.

A third stage of the force calibration, composed of a multiplication of the output variable from the second stage of the force calibration with a weighting factor, can be provided in step 19 and is in principle redundant with respect to the first and second stages of the force calibration. The resultant corrected setpoint current request $I_{corr\_end}$ is output, said setpoint current request $I_{corr\_end}$ ensuring that a force value of the additional restoring force $F_{add\_setp}$ which is constant over the entire angular range of the pedal lever is generated for a predetermined setpoint current request $I_{setp}$ independently of the pedal position and therefore independently of the angular position α of the electromechanical actuator 4.

The characteristic diagram 14 in the first stage of the force calibration is embodied as a matrix. This matrix is either filled with empirically acquired data for each individual pedal or from the force calibration of a representative batch of accelerator pedal modules or with data of a model calculation of the accelerator pedal unit. During the empirical recording of data it is necessary to determine the resultant additional restoring force $F_{add}$ at the pedal plate 1 with the aid of the force measuring pickup 13 for all the angular positions of the electromechanical actuator 4 and for various setpoint current requests which are fed to the system. A linear relationship between the various setpoint current requests $I_{setp}$ to the electromechanical actuator 4 and the additional restoring force $F_{add}$ is then implemented over the entire pedal stroke S and over all the angular positions α of the electromechanical actuator 4 by obtaining the nonlinearities by calculation using the empirically acquired data.

The method of the first stage alone is time consuming and therefore not very suitable for use in series production. For this reason, on the one hand the above-mentioned matrix is generally filled with average values. On the other hand, the further stages of the force calibration are then necessarily arranged downstream.

The data of the characteristic curve which is necessary for the second stage of the force calibration is acquired by a similar process, wherein significantly fewer parameters than during the determination of the correction matrix of the first stage of the force calibration have to be determined here. Overall, in this context the resulting restoring forces $F_{add}$ are measured at various angular positions of the pedal plate 11 for various setpoint current requests $I_{setp}$. Subsequently, the corresponding value of the characteristic curve is determined for each setpoint current request value in such a way that the requested linear relationship between the setpoint current request $I_{setp}$ to the electromechanical actuator 4 and the additional restoring force $F_{add}$ is obtained over the entire angular range with the accuracy required by the purpose of use.

The determination of the weighting factor from the third stage of the force calibration occurs in an analogous way to the determination of the characteristic curve above, but with even fewer measured values.

Since the stages of the force calibration are intentionally redundant, it is possible, given suitable correction data of the respectively preceding stage of the force calibration and a correspondingly small sample variation of the accelerator pedal module, to apply the respective method which requires the least time and is therefore the most cost effective.

The invention claimed is:

1. A method for operating an accelerator pedal unit for motor vehicles, wherein a change in position of a pedal plate, which is brought about by a corresponding activation force, with respect to the starting position of said pedal plate counter to a restoring force ($F_{res}$) of a pedal restoring spring brings about an increase in the driving force of the drive motor of the motor vehicle, and when the activation force diminishes the restoring force of the pedal restoring spring moves the pedal plate back in the direction of its starting position, wherein an electromechanical actuator which can be actuated externally is arranged in such a way that an additional restoring force ($F_{add}$) acting on the pedal plate can be set, wherein a calibration process is carried out, with the result that a linear relationship is implemented between the setpoint current request ($I_{setp}$) to the electromechanical actuator and the additional restoring force ($F_{add}$) over the entire pedal stroke (S).

2. The method as claimed in claim 1, wherein the calibration process is carried out in such a way that a constant force value of the additional restoring force ($F_{add-setp}$) is generated for a predetermined setpoint current request ($I_{setp}$) at each angular position (a) of the electromechanical actuator.

3. The method as claimed in claim 1, wherein the calibration process is carried out using a characteristic diagram.

4. The method as claimed in claim 3, wherein the angular position (α) of the electromechanical actuator and a setpoint current request ($I_{setp}$) are fed to the characteristic diagram from a control unit.

5. The method as claimed in claim 4, wherein the angular position (α) of the electromechanical actuator is limited before the value of the angular position (α) is fed to the characteristic diagram.

6. The method as claimed in claim 4, wherein the output value ($K_{out}$) from the characteristic diagram is subsequently multiplied by the setpoint current request ($I_{setp}$) in order to obtain a corrected setpoint current request ($I_{corr}$).

7. The method as claimed in claim 6, wherein the corrected setpoint current request ($I_{corr}$) is fed to a further characteristic curve.

8. The method as claimed in claim 7, wherein a correction factor is added to the corrected setpoint current request ($I_{corr}$).

9. The method as claimed in claim 3, wherein the characteristic diagram is embodied as a matrix which is determined on the basis of empirically acquired data or on the basis of a model calculation of the accelerator pedal unit.

10. The method as claimed in claim 1, wherein a force measuring pickup is arranged on the tread area of the pedal plate in order to measure the additional restoring force ($F_{add}$) generated by the electromechanical actuator.

* * * * *